UNITED STATES PATENT OFFICE.

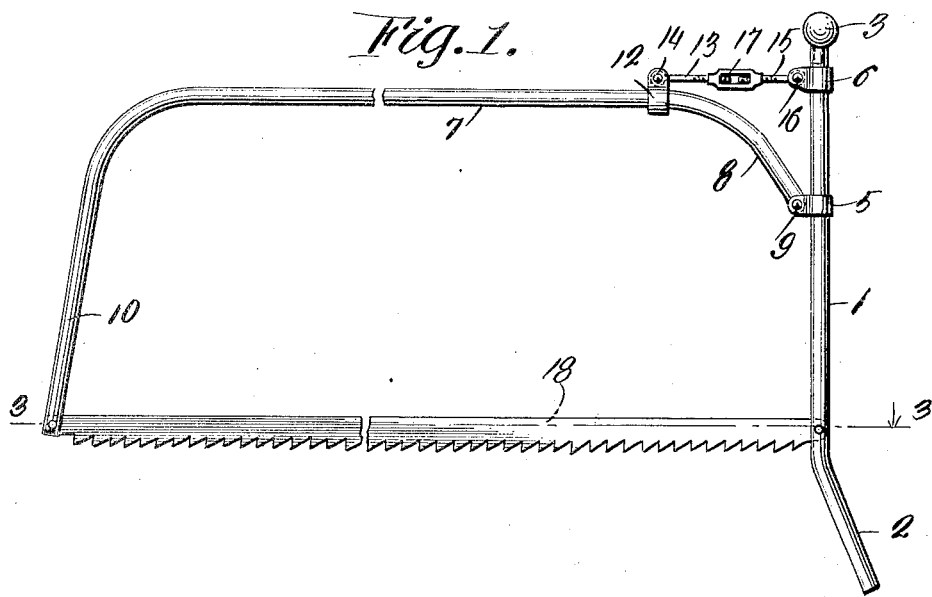

THOMAS OUELLETT, OF CENTRAL FALLS, RHODE ISLAND.

SAW-FRAME.

1,351,121.  Specification of Letters Patent.  Patented Aug. 31, 1920.

Application filed October 4, 1919. Serial No. 328,365.

*To all whom it may concern:*

Be it known that I, THOMAS OUELLETT, a citizen of the United States, residing at Central Falls, in the county of Providence and State of Rhode Island, have invented certain new and useful Improvements in Saw-Frames, of which the following is a specification.

My invention relates to new and useful improvements in a saw frame and has for its principal object the construction of a device of this character which is simple, inexpensive, and light so that the parts may be readily assembled and the whole carried from place to place.

Another object resides in novel means for holding the saw blade and means for adjusting the frame so as to put the blade under tension.

With these and other objects in view my invention consists in the novel details of construction and arrangement of parts which will be more clearly understood from the following specification and drawings in which:—

Figure 1 is a side elevation.

Fig. 2 is a top plan, and

Fig. 3 is a longitudinal section on the line 3—3 of Fig. 1 looking in the direction of the arrows.

In carrying out my invention the saw frame is formed of a tubing 1 the lower end of which is bent at a slight angle to form a hand-hold 2. A knob or hand-hold 3 is secured to the upper end of the tubing 1 by having a reduced extension entering the end of the tube. A slot 4 is formed through the tube 1, adjacent the curved portion 2, for a purpose to be later described. A clamp 5 is secured around the tube 1, intermediate the ends thereof, and a similar clamp 6 is secured around the tube adjacent the upper end. A horizontally extending tube 7 is provided on one end with the downwardly curved portion 8 which is pivotally connected to the clamp 5 at 9. The opposite end of the tube 7 is bent downwardly at substantially right angles to form an arm 10 having a slot 11 formed in the lower end for a purpose to be later described. A clamp 12 is secured to the tube 7 adjacent the curved portion 8 and a threaded rod 13 is pivotally connected to the clamp 12 at 14. A threaded rod 15 is pivotally connected to the clamp 6 at 16 and a turn buckle 17 connects the ends of the threaded rods 13 and 15. The clamps 5, 6 and 12 are of a similar construction so as to provide a split clamping ring which has the projecting perforated ears for receiving the pins or rivets for the purpose specified.

A saw blade 18 is provided with a reduced extension on each end thereof. The extension on one end is adapted to pass through the slot 4 formed in the tube 1 and the extension on the opposite end is adapted to pass through the slot 11 formed in the end of the arm 10. A pin 19 passes through the tube 1 and end of the blade 18 and a similar pin 20 passes through the tube 10 and extension on the blade.

In Fig. 1 of the drawings I have illustrated the saw frame with the blade secured in position ready for use. If it is desired to remove the blade 18 the turn buckle 17 is rotated thereby swinging the tube 1 on the pivot 9 so as to force the lower end of the tube 1 toward the tube 10. When this has been done the pins 19 and 20 may be removed and the ends of the blades taken out of the slots. When assembling the ends of the blades are again placed into the slots of the respective tubes 1 and 10 and the pins inserted. By rotating the turn buckle 17 the tubes 1 and 10 are separated so that the blade 18 is put under tension. In sawing one hand grips the curved extension 2 and the other hand may engage the knob 3. It will be seen that I have constructed a saw frame which is simple in construction and which may be very cheaply made. At the same time it will be seen that the blades may be secured to the frame very easily or removed therefrom.

The foregoing description and the drawings have reference to what may be considered the preferred, or approved form of my invention. It is to be understood that I may make such changes in construction and arrangement and combination of parts, materials, dimensions, etc., as may prove expedient and fall within the scope of the appended claim.

Having fully described my invention what I claim as new and desire to secure by Letters Patent is:—

A saw frame comprising a rod having an arm connected at one end to the saw, the other end of the rod being pivotally connected to another rod transverse to the body of said first rod and having a saw pivotally connected to the second rod on the other side of the first mentioned pivot and to the body of the first mentioned rod each of the three pivotal connections comprising a like split clamping ring, two of which clamp the second mentioned rod and one the body of the first mentioned rod, and having projecting ears connected by a pin or rivet which forms the pivot of the first mentioned rod and for the two ends of the adjustable brace.

In testimony whereof I affix my signature in presence of two witnesses.

THOMAS OUELLETT.

Witnesses:
 PHILIPPS GRISÉ,
 DONAT MARIES.